United States Patent [19]

Ogawa et al.

[11] Patent Number: 4,559,193
[45] Date of Patent: Dec. 17, 1985

[54] METHOD OF SEALING OPEN ENDS OF CERAMIC HONEYCOMB STRUCTURAL BODY

[75] Inventors: Yutaka Ogawa; Shunichi Yamada, both of Nagoya; Toshiyuki Hamanaka, Suzuka, all of Japan

[73] Assignee: NGK Insulators, Ltd., Japan

[21] Appl. No.: 487,028

[22] Filed: Apr. 21, 1983

[30] Foreign Application Priority Data

Sep. 20, 1982 [JP] Japan .................... 57-163514

[51] Int. Cl.⁴ .............................. B01D 39/20
[52] U.S. Cl. .................... 264/60; 55/523; 156/89; 264/63; 428/117
[58] Field of Search ............. 264/60, 63; 428/117; 156/89; 55/523

[56] References Cited

U.S. PATENT DOCUMENTS 4,293,357 10/1981 Higuchi et al. .................. 264/63
4,364,760 12/1982 Higuchi et al. ................. 428/117
4,404,007 9/1983 Tukao et al. ................... 428/117

Primary Examiner—James Derrington
Attorney, Agent, or Firm—Parkhurst & Oliff

[57] ABSTRACT

The disclosed method seals preselected open ends of channels of a ceramic honeycomb structural body by attaching a film to that end surface of the honeycomb structural body which is to be selectively sealed while boring holes on the film at positions corresponding to desired open ends of the channels to be sealed, dipping the end surface in a sealing material containing slurry, pressing sealing material mixture body in the desired channels open ends, and then firing the ceramic honeycomb structural body with the sealing materials applied thereto.

11 Claims, 8 Drawing Figures

4,559,193

METHOD OF SEALING OPEN ENDS OF CERAMIC HONEYCOMB STRUCTURAL BODY

BACKGROUND OF THE INVENTION

1. Field of the Invention

This invention relates to a method of sealing open ends of channels of a ceramic honeycomb structural body which is used for purifying harmful gases such as automobile exhaust gas or industry-plant exhaust gas, and more particularly the invention relates to a method of sealing open ends of channels of a ceramic honeycomb structural body which forms a heat exchanger or a ceramic filter for removing particulates from automobile exhaust gas or a ceramic honeycomb structural body for supporting catalysts.

2. Description of the Prior Art

Recently, ceramic honeycomb structural bodies have been used as catalyst carriers for purifying automobile exhaust gas or as heat exchangers, and much attention has been paid to various advantages of such ceramic honeycomb structural bodies; namely, that pressure loss of gas flow therethrough is low because a large number of substantially straight and parallel channels are uniformly distributed in the ceramic honeycomb structural body, that the surface area per unit volume is large, and that the ceramic honeycomb structural body can be heated up to a high temperature by a small amount of heat energy because the channels thereof are surrounded only by thin walls.

For instance, it is known to make a ceramic honeycomb filter by taking advantage of the fact that the ceramic honeycomb structural body has a large surface area per unit volume and that the partition walls or inside walls of the ceramic honeycomb structural body have a large number of channels therein and the channels are porous and very thin. More specifically, certain channels of the ceramic honeycomb structural body are sealed by a suitable sealing material at one end thereof, while the remaining channels of the ceramic honeycomb structural body are sealed by a suitable sealing material at an opposite end thereof, so that the partition walls form filtering layers for providing a large filtering area per unit volume of the ceramic honeycomb filter while ensuring a low pressure loss therethrough. In this filter, the thin porous partition walls capture particulates from the exhaust gas passing therethrough, so as to perform an effective filtration. Accordingly, the sealing material which seals the end openings of the channels of such ceramic honeycomb filter is required to be tightly bonded to the peripheral walls and partition walls so as to form a perfect seal without any leakage of the dust-containing gas. Thus, reliable sealing of the open ends of the ceramic honeycomb structural body channels is the most important point in producing the ceramic honeycomb filters. When the ceramic honeycomb structural body is used as a carrier of catalysts, open ends of the channels in the proximity of the outer peripheral wall of the honeycomb structural body are sometimes sealed by a suitable sealing material for the purpose of improving the mechanical strength thereof, and the sealing material of such a catalyst-supporting ceramic honeycomb structural body is also required to be tightly bonded to the partition walls of the honeycomb structural body.

As to the production of such ceramic honeycomb filters, the following methods are known: namely, a method disclosed by Japanese Patent Application Laid-open Specification No. 7215/1982 which comprises steps of adhering a film onto at least one end surface of a ceramic honeycomb structural body, boring holes on the film at positions corresponding to desired open ends of the channels to be sealed, and pressing a dilatant sealing material into the desired open ends of the channels; a method similar to the last mentioned method except that viscous sealing material is introduced into the desired open ends of channels to be sealed by dipping; and a method comprising steps of adhering a film onto at least one end surface of a ceramic honeycomb structural body, boring holes on the film at positions corresponding to those open ends of the channels which are to be left open, introducing epoxy resin into the open ends of the channels to be left open by dipping in a manner similar to that of the last mentioned methods, hardening the epoxy resin thus introduced, removing the film, and introducing a sealing material under pressure into the desired open ends to be sealed.

The above-mentioned conventional method using the pressing of the dilatant sealing material into the desired open ends of the channels has a shortcoming in that, when the film is bored at the positions corresponding to the desired channels open ends to be sealed, each bored hole of the film must be exactly the same in shape and size as that of the corresponding channels open end to be sealed, and if the hole of the film is too small, gap are likely to be formed between the sealing material and the partition walls of the honeycomb structural body channels so as to cause serious defects in the performance thereof. Besides, even if special needle-like jigs are used, it is difficult to perforate the film at a reasonably high speed while ensuring exactly the same size and shape of the film holes as those of the honeycomb structural body channels to be sealed without chipping the porous fragile sidewalls of the honeycomb structural body channels. It is also difficult to produce satisfactory sealing of irregularly-shaped channels or cells of the honeycomb structural body at the periphery thereof. The sealing material used in this method is required to be dilatant, and when the major ingredients of the sealing material are plastic raw materials such as clay and minerals, it is very complicated to prepare suitable binders of the sealing material because such ingredients tend to render a large thixotropy to the sealing material body.

In the above-mentioned method using the introduction of the viscous sealing material by dipping, difficulties have been experienced in that the sealed end surfaces tend to be uneven, and that, when the honeycomb structural body has a low cell density or when the channels of the honeycomb structural body have a large cross-sectional area, the dipping operations must be repeated a number of times.

The above-mentioned method using the introduction and hardening of epoxy resin in the channels to be left open has shortcomings in that the process of the method is time-consuming, and that the thermal expansion of epoxy resin is, in general, larger than that of the ceramic material of the honeycomb structural body and tends to crack the honeycomb structural body, so that extra care must be paid to selection of suitable epoxy resin.

SUMMARY OF THE INVENTION

Therefore, an object of the present invention is to obviate the above-mentioned shortcomings of the prior art by providing an improved method of sealing open ends of channels of a ceramic honeycomb structural body.

Another object of the invention is to provide a method of forming reliable and very tight seals at selected positions of open ends of channels of a ceramic honeycomb structural body by firstly applying a suitable sealing material slurry-form and secondly pressing a kneaded pasty sealing material green body into desired open ends of the honeycomb structural body channels, and then firing the honeycomb structural body.

In a preferred embodiment of the invention, a film is attached to that end surface of a ceramic honeycomb structural body which is to be selectively sealed, and holes are bored on the film either before or after the attaching of the film to the honeycomb structural body, which holes of the film are bored at positions corresponding to desired open ends of the honeycomb structural body channels to be sealed. The film-attached end of the honeycomb structural body is dipped into a sealing material containing slurry, and then a kneaded pasty sealing material green body is plugged into desired open ends by pressing it into open ends. The ceramic honeycomb structural body with the sealing material thus twice applied thereto, firstly in the form of a slurry and secondly in the form of a kneaded pasty green body, is fired so as to seal the desired open ends of the channels thereof. In the method of the invention, a suitably pre-perforated film may be attached to the end surface of the ceramic honeycomb structural body while aligning the preperforated holes of the film with the desired open ends of the honeycomb structural body channels to be sealed.

BRIEF DESCRIPTION OF THE DRAWINGS

For a better understanding of the invention, reference is made to the accompanying drawings, in which.

Figure 1:
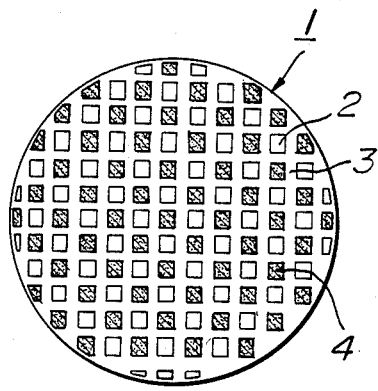
FIG. 1 is an end view of a ceramic honeycomb filter.
Figure 2:
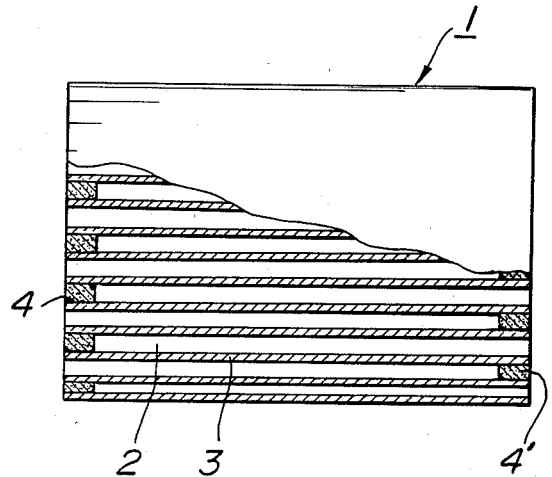
FIG. 2 is a partially cutaway side view of the ceramic honeycomb filter of FIG. 1.

Throughout different views of the drawings, the numeral 1 is a ceramic honeycomb structural body, the numeral 2 is a channels, the numeral 3 is a porous partition wall, the numeral 4 and the numeral 4' are sealing members of the channel, the numeral 5 is an irregular-shaped cell at the periphery of a ceramic honeycomb structural body, the numeral 6 is a film, the numeral 7 is a hole, the numeral 8 is a sealing material containing slurry, and the numeral 9 is a kneaded pasty sealing material green body.

DESCRIPTION OF THE PREFERRED EMBODIMENTS

Figure 3:
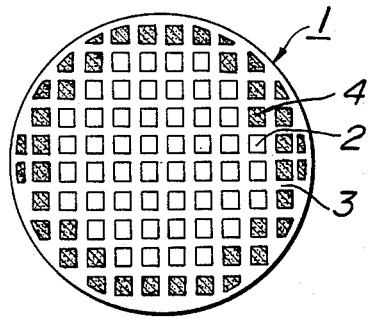
FIG. 3 is an end view of a ceramic honeycomb structural body having peripheral portions thereof reinforced.
Figure 4:
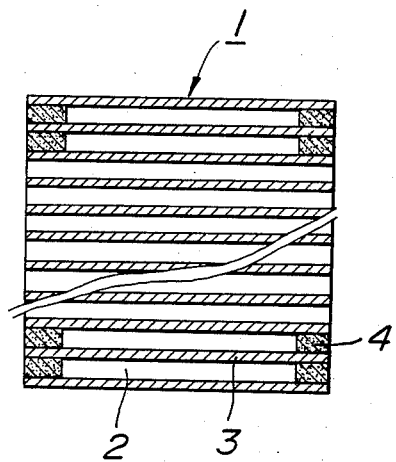
FIG. 4 is a longitudinal sectional view of the ceramic honeycomb structural body of FIG. 3.

Referring to FIG. 1, a ceramic honeycomb structural body 1 has a plurality of channels 2 defined by thin porous partition walls 3, and some of the channels 2 have one side open ends thereof plugged by sealing members 4 while the remainder of the channels 2 have the opposite open ends thereof plugged by similar sealing members 4', so as to produce a ceramic honeycomb filter with filtering layers formed from the porous partition walls 3. The thus produced ceramic honeycomb filter has a large filtering area per unit volume thereof and a low pressure loss therethrough. When high mechanical strength of the ceramic honeycomb structural body is required, open ends of the channels 2 in the proximity of the outer peripheral wall of the honeycomb structural body 1 are sealed at opposite ends thereof, as shown in FIGS. 3 and 4. In any case, tight bonding between the sealing members 4 or 4' and the partition walls 3 of the honeycomb structural body 1 is of prime importance for satisfactory performance of the ceramic honeycomb filter or catalyst-supporting ceramic honeycomb structural body.

Figure 5:
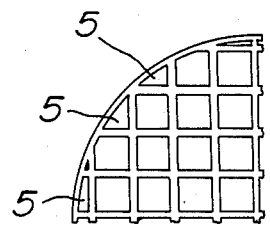
FIG. 5 is an explanatory diagram of irregularly-shaped end openings of channels along the periphery of a ceramic honeycomb structural body.

In the course of placing the sealing material 4 into the open ends of ceramic honeycomb structural body channels 2 to be sealed, the presence of irregular-shaped cells 5 as shown in FIG. 5 renders it difficult to produce tight bonding of the sealing material 4 to the sidewalls 3 of the channels 2, because the boring of holes on the film with the same size and shape as those of the irregular-shaped cells 5 is extremely difficult, and without such holes on film, the tight bonding of the sealing material 4 with the sidewalls 3 of the irregularly-shaped cells 5 is difficult to obtain.

The method of the invention, which provides the desired tight bonding, will be described in detail now. The invention also attaches a film 6 to the entire span of that end surface of the ceramic honeycomb structural body 1, such as a ceramic honeycomb filter 1, which end surface has open ends of the honeycomb structural body channels 2 to be sealed, as disclosed by Japanese Patent Application Laid-open Specification No. 7215/1982. The film 6 used in the method of the invention is preferably a film of organic high molecular weight compound such as polyester and vinyl, or a sheet of paper impregnated with resin. Since the method of the invention uses a step of dipping, the film 6 should have a sufficient strength and a sufficient water-resistivity to withstand the dipping operation.

Figure 6:
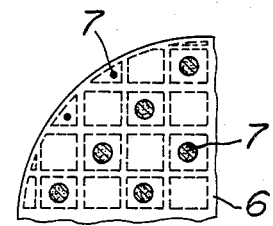
FIG. 6 is an explanatory diagram of holes bored on a film attached to one end surface of a ceramic honeycomb structural body.

In an embodiment of the invention, the film 6 attached to the end surface of the ceramic honeycomb structural body is perforated at positions corresponding to the open ends of the channels 2 to be sealed. A number of boring means is available to the perforating operation of the film 6, such as a needle-like jig or a boring means using a laser beam. Referring to FIG. 6, in the case of ceramic honeycomb filters, it is sufficient for each hole 7 to have an opening area corresponding to 40–60% of that of the open end of the channels 2 being sealed. Preferably, the perforation is effected at a high speed without allowing any direct contact of the boring jig with the partition walls 3 of the channels 2, because any contact between the boring jig and the partition walls 3, may crack the partition walls 3. As to the film 6 covering the open end of the irregularly-shaped cells 5 of FIG. 5, it is sufficient to have a small hole 7 on the film 6 at about the central portion of the cross section of the irregularly-shaped cell 5, as shown in FIG. 6. The irregularly-shaped cells 5 along the periphery of the ceramic honeycomb structural body 1 may be directly dipped into a sealing material containing slurry without having the film 6 applied to the cells 5 before the dipping. When the periphery of a ceramic honeycomb structural body 1 is mechanically reinforced by sealing the open ends of channels thereat, as in the case of a catalyst-supporting ceramic honeycomb structural body, a suitable sealing material may be introduced into the desired open ends of the peripheral channels while attaching the film 6 only to those channels open ends which are not to be sealed.

The method of the invention uses two phases of sealing material, namely a sealing material containing slurry and a sealing material green body, said sealing material green body being introduced to open ends of the ceramic honeycomb structural body channels after the sealing material containing slurry is applied to such open ends by dipping. The kneaded pasty sealing material green body is not required to be dilatant, but the sealing material mixture body can contain raw clay, kaolin, or other plastic ingredients. Preferably, the sealing material containing slurry contains the ingredients of the sealing material green body, or the ingredients of the sealing material containing slurry are such that after being fired both the sealing material containing slurry and the sealing material green body have substantially the same compositions. However, the composition of the sealing material containing slurry may be different from that of the sealing material green body, provided that a suitable matching is produced at the boundary between the sealing material containing slurry and the sealing material green body so as to ensure tight bonding therebetween.

For instance, when sealing material compositions of cordierite system are used, the following sealing material containing slurry and sealing material green body can be used: namely, a sealing material containing slurry consisting of 40–60 parts by weight of cordierite composition green material batch containing kaolin, talc, and alumina, 40–60 parts by weight of water, and 1 part by weight of carboxymethylcellulose; and a kneaded pasty sealing material green body consisting of 100 parts by weight of cordierite powder particles, 1 part by weight of methyl cellulose, 10 parts by weight of glycerin, and 20–30 parts by weight of water. If the sealing material green body is made of green material batch containing a large amount of raw clay, kaolin and the like, such sealing material green body has a large thixotropy, and care should be taken to produce a tight seal by controlling the amount of that sealing material which is applied at the time of dipping.

As a first step to introduce the sealing material to the ceramic honeycomb structural body, that end surface of the ceramic honeycomb structural body which has a film attached thereto and perforated at positions corresponding to the desired open ends of the honeycomb structural body channels to be sealed is dipped into the sealing material containing slurry, and the sealing material containing slurry is introduced into the desired channels open ends. The depth of the sealing material introduced in the ceramic honeycomb structural body channel is determined by how deep the ceramic honeycomb structural body is dipped in the above-mentioned dipping process. In order to keep a constant depth of the sealing material in the channels, the depth of the above-mentioned dipping must be kept contant. Each of the irregularly-shaped cells 5 along the periphery of the ceramic honeycomb structural body has a comparatively small opening area at the opening ends of the channels thereof, and such cells 5 may be completely sealed simply by introducing the sealing material containing slurry alone thereinto. The ceramic honeycomb structural body with the sealing material containing slurry introduced thereto is dried, so that the sealing material mixture body can be introduced the thus dried slurry adhered to the partition wall of the honeycomb structural body. However, this drying need not be very complete. In fact, when the amount of the sealing material containing slurry applied to the partition walls of the ceramic honeycomb structural body channels is small due to the low viscosity of the slurry, the dipping operation may be repeated until a suitable amount of the slurry is adhered thereto. The sealing material mixture body is pressed into the ceramic honeycomb structural body either by placing the honeycomb structural body in a cylinder so as to force the sealing material green body into the ceramic honeycomb structural body by a co-acting piston, or by placing the ceramic honeycomb structural body on the surface of a lump of the sealing material green body and pressing the ceramic honeycomb structural body from the above.

The above-mentioned pressing of the sealing material green body effects complete sealing of the desired open ends of the ceramic honeycomb structural body channels to be sealed.

Figure 7:
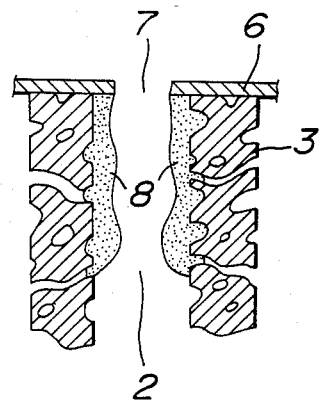
FIG. 7 is a schematic sectional view of the open end of a ceramic honeycomb structural body channels to be sealed, showing the conditions after a sealing material containing slurry is applied thereto.
Figure 8:
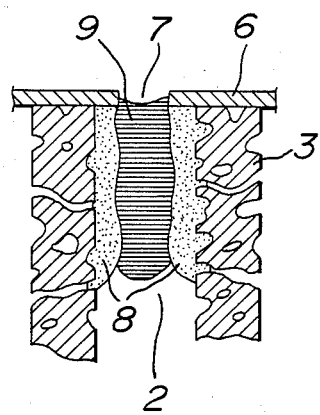
FIG. 8 is a view similar to that of FIG. 7, showing the conditions after a sealing material mixture body is introduced to the open end having the sealing material containing slurry applied thereto.

Referring to FIG. 7 and FIG. 8, the process of sealing the open ends of the channels with the sealing material containing slurry and the sealing material green body will now be described. The film 6 attached to one end surface of the ceramic honeycomb structural body is perforated so as to form holes 7 at positions corresponding to the desired open ends of the channels 2 to be sealed, and a layer of sealing material containing slurry 8 is applied to the inner surface of the partition wall 3 of each of the desired channel open ends by the above-mentioned dipping operation. A sealing material green body 9 is pressed into the thus dipped end portion of the channel 2, so as to completely seal the desired channel 2.

The ceramic honeycomb structural body having the channel thereof thus sealed at one or two end surfaces thereof is fired at a temperature dependent upon the kind of sealing material used. When the sealing material used contains the green body material of the ceramic honeycomb structural body, the temperature of the above-mentioned firing after the pressing of the sealing material green body is preferably similar to the firing temperature of the ceramic honeycomb structural body. Especially, in the case of ceramic honeycomb bodies to be used for removing particulates from automobile exhaust gases, such ceramic honeycomb structural bodies are required to withstand a temperature higher than 1,300° C., as an indispensable physical property thereof, so that the sealing material used must be fired at the required withstand temperature or higher.

The method of the invention will be described in further detail by referring to Examples now.

EXAMPLE 1

A number of cordierite honeycomb structural bodies, each of which had an outside diameter of 118 mm, a length of 152 mm, and channels defined by 0.30 mm thick partition walls at a rate of 31 holes per square centimeter, were prepared. Films made of water-repellent paper sheets impregnated with adhesive resin were tightly attached to the opposite end surfaces of each of the cordierite honeycomb structural bodies. With needle-like jigs, each of which had a diameter of 0.8 mm, the films attached to the opposite end surfaces of the cordierite honeycomb body were perforated in a checker-flag pattern at positions corresponding to the desired open ends of the channels to be sealed, as shown in FIG. 6. Each of the holes thus bored had an opening area corresponding to about 50% of that of the desired open end of the channels to be sealed. Only small holes were bored on the film at positions corresponding to the irregularly-shaped cells 5 along the periphery of the cordierite honeycomb structural body.

light beams leaked or not. The result of the light leak check is also shown in Table 1.

TABLE 1

| Ingredients of sealing material and Sealed conditions of channels | | Samples of invention | | | | References | |
|---|---|---|---|---|---|---|---|
| | | No. 1 | No. 2 | No. 3 | No. 4 | No. 1 | No. 2 |
| Sealing material containing slurry (% by weight) | Cordierite powder (−74μ) | 51 | | | | 55 | |
| | Talc (−149μ) | | 20 | 20 | 20 | | |
| | Kaolin (−149μ) | | 13 | 13 | 13 | | |
| | Calcined kaolin (−149μ) | | 11 | 11 | 11 | | — |
| | Alumina (−149μ) | | 7 | 7 | 7 | | |
| | Water | 48 | 48 | 48 | 48 | 43 | |
| | Carboxymethylcellulose | 1 | 1 | 1 | 1 | 1 | |
| Sealing material mixture body (% by weight) | Cordierite powder (−105μ) | 100 | 100 | 100 | | | 100 |
| | Glycerin | 10 | 10 | | 10 | | 10 |
| | Polyvinyl alcohol | | | 8 | | | |
| | Methyl.cellulose | 1 | 1 | 1 | 0.8 | | 1 |
| | Water | 30 | 30 | 30 | 29 | — | 30 |
| | Talc (−149μ) | | | | 40 | | |
| | Kaolin (−149μ) | | | | 22 | | |
| | Calcined kaolin (−149μ) | | | | 23 | | |
| | Alumina (−149μ) | | | | 15 | | |
| Sealed conditions of channel | Depth of sealing (mm) | 9–15 | 8–16 | 9–15 | 9–15 | 9–15 | 5–41 |
| | Light leakage from edge* | None | None | None | None | None | Some |
| | Light leakage after cut** | None | None | None | None | Some | Some |

NOTES:
*Light leakage at one end edge surface of each ceramic honeycomb filter was checked by eyesight when light beams were projected from the opposite end thereof in parellel to the channels thereof.
**Light leakage was similarly checked after cutting off opposite end portions of each ceramic honeycomb filter at 5 mm from end surfaces.

Samples No. 1 through No. 4 of the sealing material of the invention and References No. 1 and No. 2 of conventional sealing material were prepared as shown in Table 1. Each of the Samples included a sealing material containing slurry and a sealing material green body. Each opening of the channels of the above-mentioned cordierite ceramic honeycomb structural bodies, with the perforated films attached on opposite end surfaces thereof, were selectively sealed at one end surface at a time by dipping one end surface in one of the above-mentioned slurry sealing materials at a depth sufficient for producing a sealing depth of 12 mm, drying at 150° C., placing the dried ceramic honeycomb structural body in a cylinder with a diameter of 125 mm, placing one of the above-mentioned sealing material green bodies on the end surface of the ceramic honeycomb structural body in the cylinder, and applying a load of 30 kg/cm² to the sealing material green body so as to press the sealing material green body into the channels to be sealed. The cordierite honeycomb structural body thus sealing at the deisred open ends of the channels thereof, was fired for 2 hours with a maximum temperature of 1,420° C., to produce a cordierite honeycomb filter.

The sealed conditions of the channels of the cordierite honeycomb filters thus produced were checked by measuring the depth of the sealing material from the open end surface of the honeycomb filter and by applying light beams to the channels of the honeycomb filter in parallel to the channels so as to examine whether the

EXAMPLE 2

A number of mullite honeycomb structural bodies, each of which had an outside diameter of 118 mm, a length of 152 mm, and channels defined by 0.43 mm thick partition walls at a rate of 16 holes per square centimeter, were prepared. Polyethylene films coated with adhesive resin were tightly attached to the opposite end surfaces of each of the mullite honeycomb structural bodies. With a gear having teeth formed at the same pitch as that of the channels to be sealed, the films attached to the opposite end surfaces of the mullite honeycomb structural body were perforated in a checker-flag pattern at positions corresponding to the desired open ends of the channels to be sealed. Each of the holes thus bored had an opening area corresponding to about 60% of that of the desired open end of the channel to be sealed. Only small holes were bored on the film at positions corresponding to the irregularly-shaped cells 5 along the periphery of the ceramic honeycomb structural body.

Samples No. 5 through No. 7 of the sealing material of the invention and Reference No. 3 of conventional sealing material were prepared as shown in Table 2. Each of the Samples included a sealing material containing slurry and a sealing material green body. End openings of the channels of the above-mentioned mullite honeycomb structural bodies, with the perforated films attached on opposite end surfaces thereof, were selectively sealed at one end surface thereof at a time by dipping one end surface in one of the above-mentioned slurry sealing materials at a depth sufficient for producing a sealing depth of 20 mm, drying, placing the dried mullite honeycomb structural body in a cylinder with a diameter of 125 mm, and pressing one of the above-mentioned sealing material green bodies into the channels to be sealed with a pressure of 30 kg/cm². The mullite honeycomb structural body thus sealed at the desired open ends of the channels thereof was fired by heating for 2 hours with a maximum temperature of 1,400° C., so as to produce a mullite honeycomb filter.

TABLE 2

| Ingredients of sealing material and Sealed conditions of channel | | Samples of invention | | | Reference |
|---|---|---|---|---|---|
| | | No. 5 | No. 6 | No. 7 | No. 3 |
| Sealing material containing slurry (% by weight) | Mullite powder (−44μ) | 41 | 30 | | |
| | Gairome-clay | | 11 | 41 | — |
| | Water | 58 | 58 | 58 | |
| | Carboxymethylcellulose | 1 | 1 | 1 | |
| Sealing material mixture body (% by weight) | Mullite powder (−44μ) | 100 | 100 | 90 | 100 |
| | Gaerome-clay | | | 10 | |
| | Glycerin | | 10 | 10 | 10 |
| | Polyvinyl alcohol | 8 | | | |
| | Methyl cellulose | 1 | 1 | 1 | 1 |
| | Water | 31 | 32 | 31.5 | 32 |
| Sealed conditions of channel | Depth of sealing (mm) | 18–22 | 17–23 | 17–23 | 5–49 |
| | Light leakage from edge* | None | None | None | Some |
| | Light leakage after cut** | None | None | None | Some |

NOTES:
*Light leakage at one end edge surface of each ceramic honeycomb filter was checked by eyesight when light beams were projected from the opposite end thereof in parallel to the channels thereof.
**Light leakage was similarly checked after cutting off opposite end portions of each ceramic honeycomb filter at 5 mm from end surfaces.

The sealing material depth and the light leakage of the mullite honeycomb filter thus produced was checked in a manner similar to that of Example 1. The result of the checking is also shown in Table 2.

As described in detail in the foregoing by referring to Examples, with the method of sealing the open ends of ceramic honeycomb structural body channels according to the present invention, very tight and highly reliable sealing of the open ends of the ceramic honeycomb structural body channels is provided, and as compared with conventional methods, the method of the invention facilitates easier production of ceramic honeycomb filters and catalyst-supporting ceramic honeycomb structural bodies having very tightly sealed channels so as to render an outstandingly high reliability and an excellent thermal shock resistivity. Thus, the method of the invention is very useful not only in the art of removing particulates from exhaust gas of internal combustion engines such as Diesel engines, but also in many other industrial fields requiring strong and reliable ceramic honeycomb structural bodies.

What is claimed is:

1. A method of sealing open ends of channels in a ceramic honeycomb structural body, comprising the steps of attaching a film on an end surface of a ceramic honeycomb structural body which is to be selectively sealed, said attached film having holes bored at positions corresponding to open ends of channels to be sealed, dipping said end surface having the film attached thereto into a sealing slurry mixture, whereby only an end portion of the ceramic honeycomb structural body is exposed to the slurry, resulting in the slurry adhering to walls of the channels to be sealed, subsequently passing a kneaded pasty sealing material green body into the ends of the channels which have slurry adhering thereto, and firing the ceramic honeycomb structural body, whereby said adhered slurry and said kneaded pasty material seal the selected channels.

2. The method as set forth in claim 1, wherein said film is attached to said end surface of the ceramic honeycomb structural body and is then perforated at said positions.

3. The method as set forth in claim 1, wherein said film is preperforated and attached to said end surface of the ceramic honeycomb structural body in such a manner that preperforated holes of said film are aligned with said selected open ends of honeycomb structural body channels to be sealed.

4. The method as set forth in claim 1, wherein some of the channels of the ceramic honeycomb structural body are sealed at one end of the honeycomb structural body, while the remainder of the channels of the ceramic honeycomb structural body are sealed at the opposite end of the ceramic honeycomb structural body.

5. The method as set forth in claim 1, wherein some of the ceramic honeycomb structural body channels in the neighborhood of the outer periphery thereof are sealed at least at one end of the ceramic honeycomb structural body.

6. The method as set forth in claim 1, wherein said ceramic honeycomb structural body is made of a material selected from the group consisting of cordierite and mullite.

7. The method as set forth in claim 1, wherein said film is a film selected from the group consisting of an organic high molecular weight compound film and a sheet of paper impregnated with a resin.

8. The method as set forth in claim 1, wherein said firing is effected at a temperature higher than 1,300° C.

9. The method as set forth in claim 1, wherein said sealing slurry mixture consists essentially of 40–60 parts by weight of cordierite composition green materials selected from the group consisting of kaolin, talc, and alumina, 40–60 parts by weight of water, and 1 part by weight of carboxymethylcellulose.

10. The method as set forth in claim 1, wherein said kneading pasty sealing material consists essentially of 100 parts by weight of cordierite powder, 1 part by weight of methyl cellulose, 10 parts by weight of glycerin, and 20–30 parts by weight of water.

11. A method of sealing open ends of channels in a ceramic honeycomb structural body, comprising of the steps of attaching a film on an end surface of a ceramic honeycomb structural body which is to be selectively sealed, said attached film having holes bored at positions corresponding to open ends of channels to be sealed, dipping said end surface having the film attached thereto into a sealing slurry mixture, whereby only an end portion of the ceramic honeycomb structural body is exposed to the slurry, said mixture consisting essentially of 40–60 parts by weight of cordierite composition green materials selected from the group consisting of kaolin, talc, and alumina, 40–60 parts by weight of water, and 1 part by weight of carboxymethylcellulose, resulting in the slurry adhering to walls of the channels to be sealed, subsequently passing a kneaded pasty sealing material green body consisting essentially of 100 parts by weight of cordierite powder, 1 part by weight of methyl cellulose, 10 parts by weight of glycerin, and 20-30 parts by weight of water into the ends of the channels which have slurry adhering thereto, and firing the ceramic honeycomb structural body, whereby said adhered slurry and said kneaded pasty materials seal the selected channels.

* * * * *